United States Patent
Kizaki et al.

(10) Patent No.: US 8,373,359 B2
(45) Date of Patent: Feb. 12, 2013

(54) LIGHT-EMITTING DEVICE AND DRIVING METHOD THEREOF

(75) Inventors: Yukio Kizaki, Kawasaki (JP); Rei Hasegawa, Yokohama (JP); Hajime Yamaguchi, Kawasaki (JP); Isao Amemiya, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 13/048,918

(22) Filed: Mar. 16, 2011

(65) Prior Publication Data

US 2011/0163687 A1 Jul. 7, 2011

Related U.S. Application Data

(63) Continuation of application No. PCT/JP2009/065639, filed on Sep. 8, 2009.

(30) Foreign Application Priority Data

Sep. 22, 2008 (JP) ................................. 2008-243047

(51) Int. Cl.
*H05B 37/02* (2006.01)
(52) U.S. Cl. .................. 315/291; 315/169.2; 315/169.3; 313/358; 313/483; 345/79; 345/204; 345/209; 345/211; 345/214
(58) Field of Classification Search ............... 315/169.2, 315/169.3, 291; 345/76–7, 204, 209, 211, 345/76–79, 214; 313/358, 483
See application file for complete search history.

(56) References Cited

U.S. PATENT DOCUMENTS

| 6,998,789 | B2* | 2/2006 | Uchida | 315/169.2 |
| 7,153,412 | B2* | 12/2006 | Inaba et al. | 205/784.5 |
| 2004/0106005 | A1* | 6/2004 | Hamada et al. | 428/690 |
| 2005/0142033 | A1* | 6/2005 | Glezer et al. | 422/58 |
| 2006/0290616 | A1* | 12/2006 | Murayama et al. | 345/76 |
| 2007/0109218 | A1* | 5/2007 | Saito et al. | 345/55 |
| 2007/0257263 | A1* | 11/2007 | Enomoto et al. | 257/72 |
| 2009/0243502 | A1 | 10/2009 | Kizaki et al. | |

FOREIGN PATENT DOCUMENTS

| JP | 10-135540 | 5/1998 |
| JP | 2007-139899 A | 6/2007 |
| JP | 2008-84644 A | 4/2008 |

OTHER PUBLICATIONS

U.S. Appl. No. 13/040,868, filed Mar. 4, 2011, Kizaki, et al.

* cited by examiner

*Primary Examiner* — Douglas W Owens
*Assistant Examiner* — Thai Pham
(74) *Attorney, Agent, or Firm* — Oblon, Spivak, McClelland, Maier & Neustadt, L.L.P.

(57) ABSTRACT

According to one embodiment, a light-emitting device includes an emitting layer, first and second electrodes, a voltage-supply circuit, an ammeter and a controller. The emitting layer includes a solution containing an emitting material and a solvent. The first and second electrodes are in contact with the solution. The voltage-supply circuit applies an operating voltage between the first and second electrodes. The ammeter measures the amount of electric current flowing between the first and second electrodes. The controller controls the operation of the voltage-supply circuit such that the polarity of the operating voltage reverses and determining a timing of reversing the polarity based on the output of the ammeter.

11 Claims, 9 Drawing Sheets

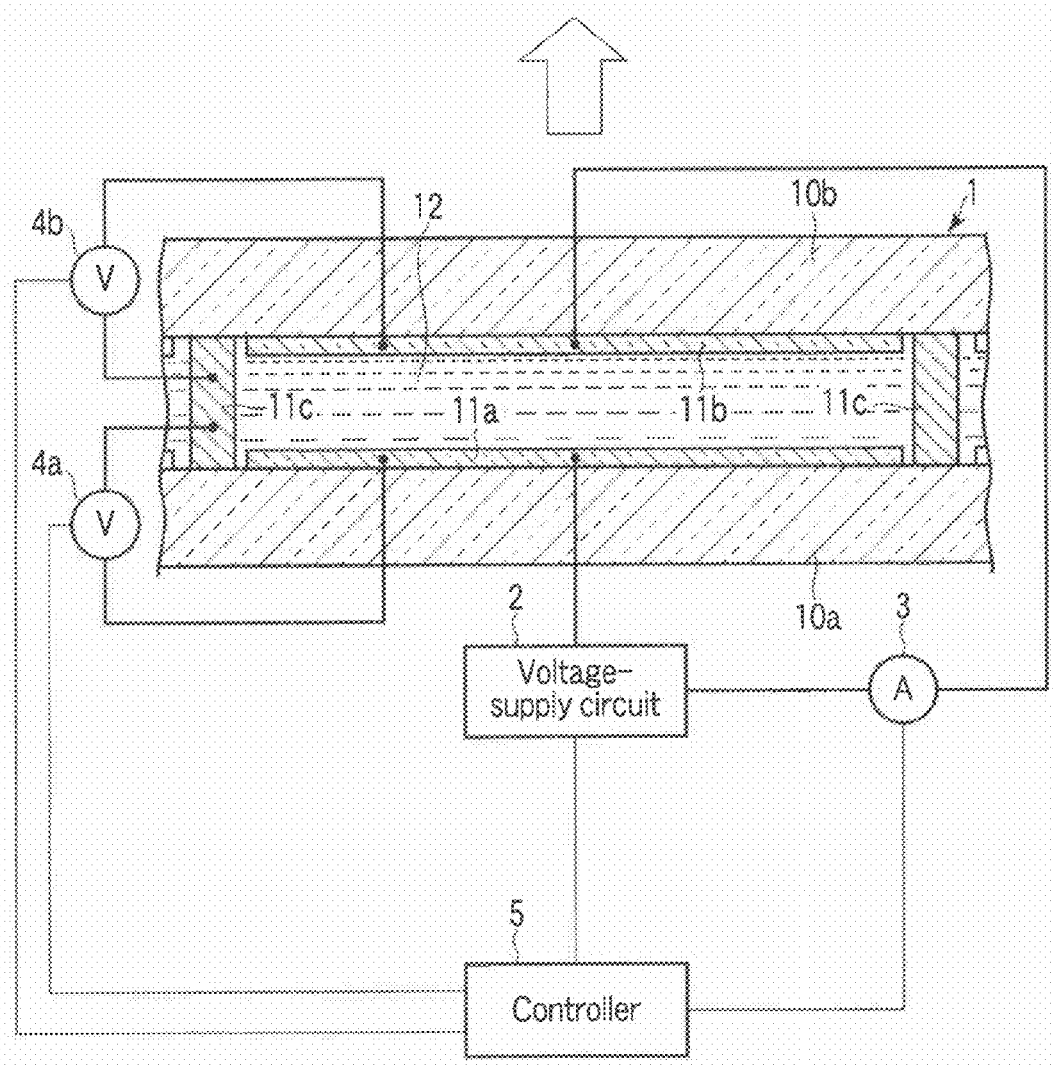
F I G. 1

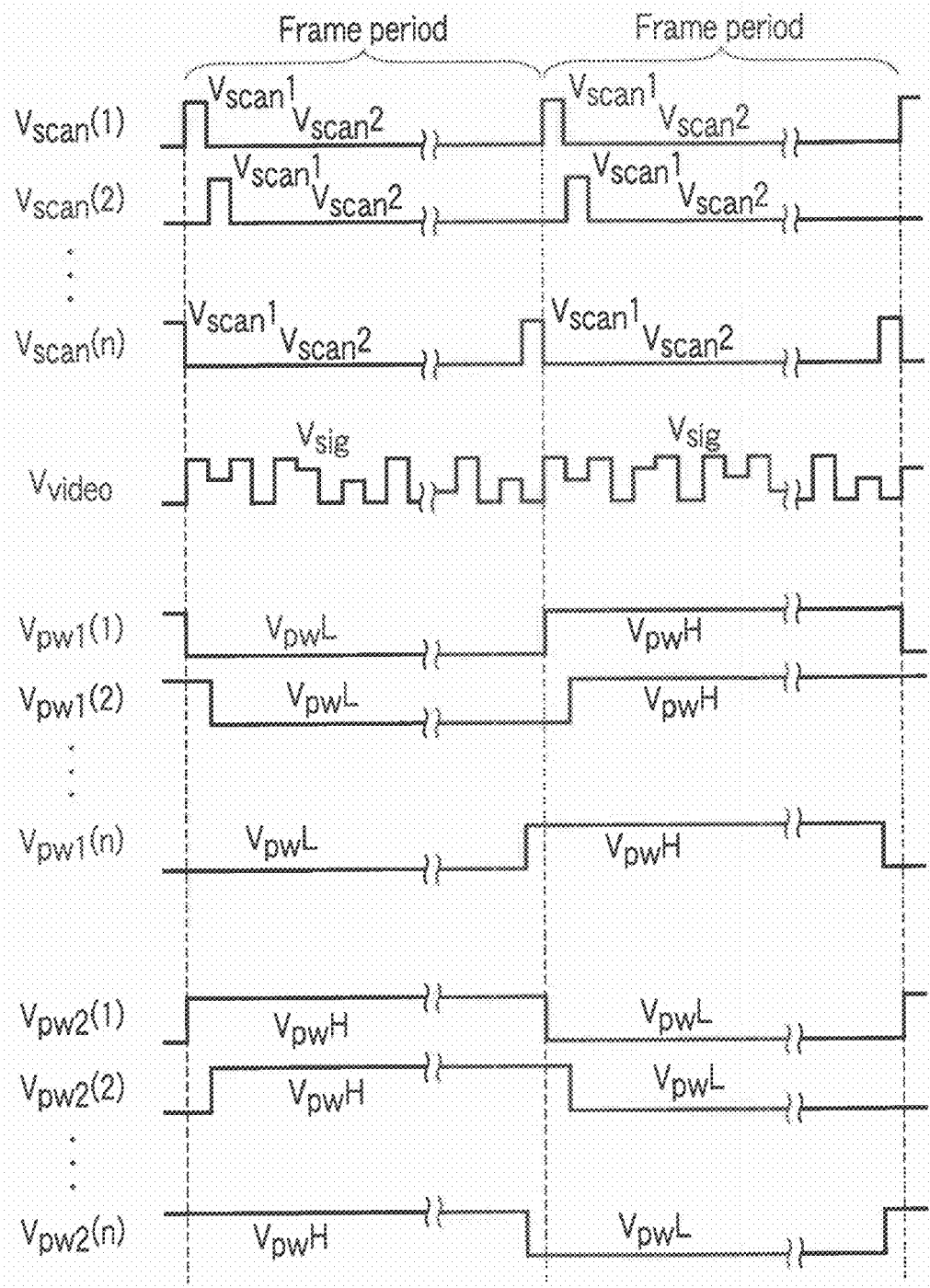
F I G. 10

LIGHT-EMITTING DEVICE AND DRIVING METHOD THEREOF

CROSS REFERENCE TO RELATED APPLICATIONS

This is a Continuation Application of PCT Application No. PCT/JP2009/065639, filed Sep. 8, 2009, which was published under PCT Article 21(2) in Japanese.

This application is based upon and claims the benefit of priority from Japanese Patent Application No. 2008-243047, filed Sep. 22, 2008; the entire contents of which are incorporated herein by reference.

FIELD

Embodiments described herein relate generally to a light-emitting device.

BACKGROUND

Organic electroluminescent (hereinafter referred to as EL) elements are thin and capable of achieving various emitting colors. Thus, applications of organic EL elements to light-emitting devices such as displays and lighting units are expected. However, organic EL elements have various problems.

For solving such problems, light-emitting elements utilizing electrochemiluminescence (hereinafter referred to as ECL) have been developed.

As described in JP-A 2008-84644 (KOKAI), the emitting layer of an ECL element is liquid. Thus, unlike an organic EL element, the emitting material of the ECL element can circulate in the emitting layer. Therefore, ECL elements are less prone to cause image burn-in as compared with organic EL elements.

Further, an organic EL element generally employs a multilayer structure including an emitting layer, charge-transporting layers, charge injection layers, and a pair of electrodes in order to achieve high luminous efficiency. By contrast, an ECL element can be composed only of an emitting layer in liquid form and a pair of electrodes. Thus, ECL elements can be manufactured at a lower cost as compared with organic EL elements.

In addition, unlike organic EL elements, ECL elements utilize an electrochemical reaction. Therefore, ECL elements can be driven at a lower voltage as compared with organic EL elements.

As above, ECL elements are superior to organic EL elements in various respects. However, light-emitting devices utilizing ECL elements have not yet been put to practical use.

BRIEF DESCRIPTION OF THE DRAWINGS

FIG. 1 is a sectional view schematically showing a light-emitting device according to a first embodiment;

FIG. 10 is a timing chart showing an example of a method of driving the display shown in FIG. 9.

DETAILED DESCRIPTION

Figure 2:
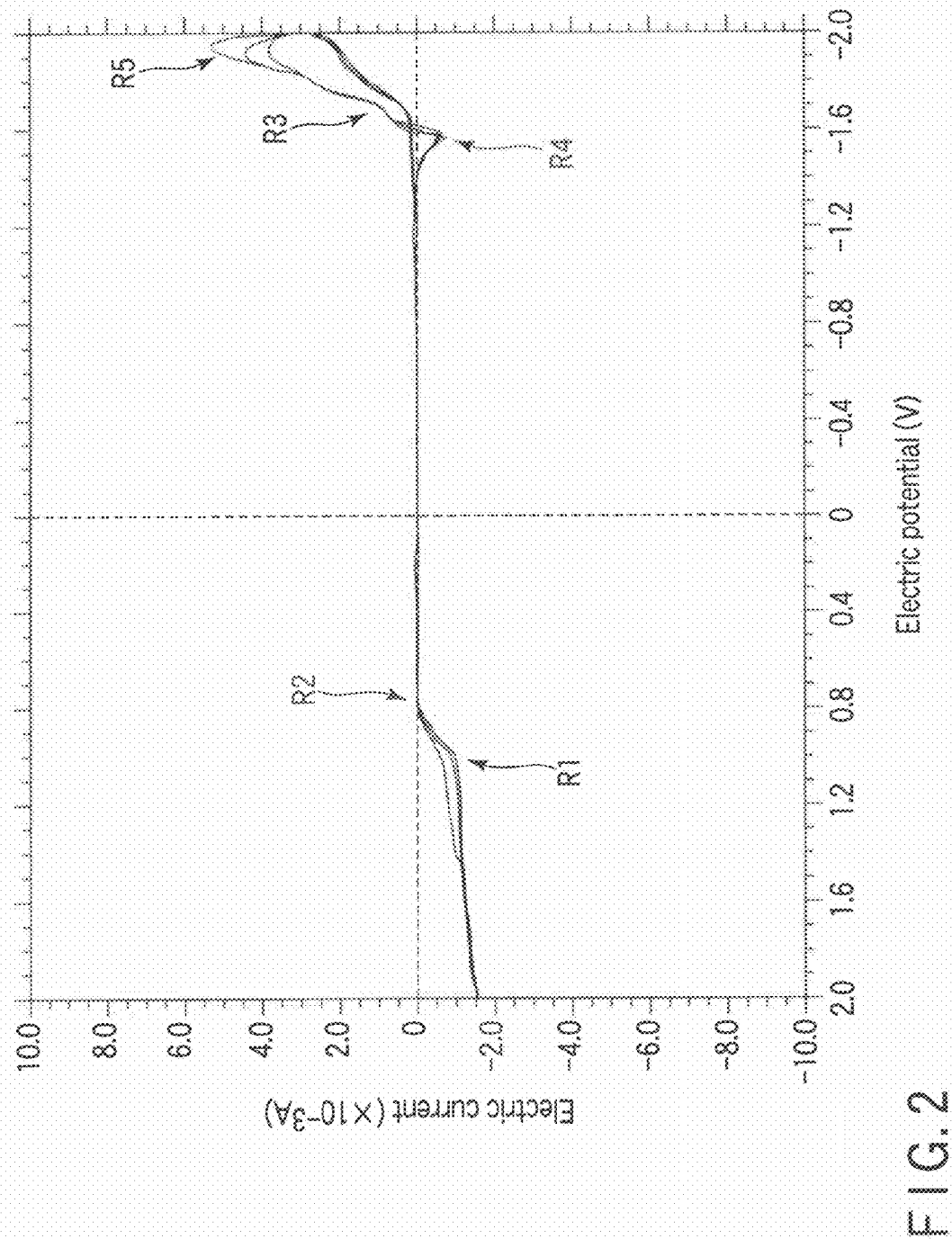
FIG. 2 is a graph showing an example of electrochemical properties of an ECL cell obtained by cyclic voltammetry.

According to one embodiment, a light-emitting device includes an emitting layer, first and second electrodes, a voltage-supply circuit, an ammeter and a controller. The emitting layer includes a solution containing an emitting material and a solvent. The first and second electrodes are in contact with the solution. The voltage-supply circuit applies an operating voltage between the first and second electrodes. The ammeter measures the amount of electric current flowing between the first and second electrodes. The controller controls the operation of the voltage-supply circuit such that the polarity of the operating voltage reverses and determining a timing of reversing the polarity based on the output of the ammeter.

Various embodiments will be described below with reference to the accompanying drawings. Note that the same reference characters in the drawings denote components that achieve the same or similar functions, and a repetitive explanation thereof will be omitted.

FIG. 1 is a sectional view schematically showing a light-emitting device according to the first embodiment.

The light-emitting device shown in FIG. 1 is, for example, a lighting unit or display. Here, for ease of explanation, the light-emitting device is assumed to be a lighting unit, which has a simpler structure than that of a display.

The lighting unit includes an ECL cell 1, a voltage-supply circuit 2, an ammeter 3, voltmeters 4a and 4b, and a controller 5. The lighting unit emits right in the direction shown as an arrow outline with a blank inside.

The ECL cell 1 includes substrates 10a and 10b. The substrates 10a and 10b face each other with a small gap therebetween. The back and front sides of the ECL cell 1 are the side of the substrate 10a and the side of the substrate 10b, respectively.

The substrate 10a may or may not have light-transmitting property. As the material of the substrate 10a, for example, glass, ceramics, plastic or semiconductor can be used. As the plastic, for example, polyethylene terephthalate, polyethylene naphthalate, polyether sulfonic acid or polycarbonate can be used. The substrate 10a may have a single-layer structure or a multilayer structure.

The substrate 10b has light-transmitting property and is typically transparent. As the material of the substrate 10b, for example, glass or plastic can be used. As the plastic, for example, the same material as that mentioned in connection with the substrate 10a can be used. The substrate 10b may have a single-layer structure or a multilayer structure.

The substrate 10a is provided with an electrode 11a on its surface facing the substrate 10b. The electrode 11a plays the role of applying voltage to the emitting layer, which will be described later, and injecting charges thereto.

The electrode 11a may or may not have light-transmitting property. For example, the electrode 11a may be transparent or have light-reflecting property. As the material of the electrode 11a, for example, a transparent material and/or light-reflective material can be used. As the transparent material, for example, transition metal oxide such as titanium oxide, zirconium oxide, hafnium oxide, strontium oxide, zinc oxide, tin oxide, indium oxide, yttrium oxide, lanthanum oxide, vanadium oxide, niobium oxide, tantalum oxide, chromium oxide, molybdenum oxide and tungsten oxide; perovskite such as $SrTiO_3$, $CaTiO_3$, $MgTiO_3$ and $SrNb_2O_3$; a composite oxide containing one or more of them; GaN; or a mixture containing one or more of them can be used. As the light-reflective material, for example, metal such as aluminum and silver or alloy can be used.

The substrate 10b is provided with an electrode 11b on its surface facing the substrate 10a. The electrode 11b plays the role of applying voltage to the emitting layer 12 and injecting charges thereto.

The electrode 11b has light-transmitting property. For example, the electrode 11b is transparent. As the material of the electrode 11b, for example, the same transparent material as that mentioned in connection with the electrode 11a can be used.

An electrode 11c is placed between the substrates 10a and 10b. The electrode 11c plays the role of a reference electrode for measuring the voltage between the solution included in the emitting layer 12 and the electrode 11a or 11b. The electrode 11c also plays the role of a spacer for arranging the substrates 10a and 10b spaced apart from each other. As the material of the electrode 11c, for example, silver can be used. The electrode 11c may be omitted.

A frame-shaped sealing layer (not shown) is further placed between the substrates 10a and 10b. The sealing layer surrounds the electrodes 11a to 11c. The substrates 10a and 10b and the sealing layer form an enclosed space. The emitting layer 12 fills the enclosed space.

The emitting layer 12 includes a solution that contains an emitting material and a solvent.

The emitting material is a material that causes electrochemiluminescence. During the period that the emitting layer 12 emits light, a part of the emitting material is present as a first cation that is soluble in the solvent, and another part of the emitting material is present as a second cation that is a reduction product of the first cation and soluble in the solvent. A reduction product of the second cation is a nonionic compound that is insoluble or low-soluble in the solvent. For example, each of the first and second cations is a complex ion, while the nonionic compound is a complex.

As the emitting material, for example, a complex including a transition metal atom and a nitrogen-containing heteroaromatic ring that coordinates the transition metal atom can be used. The transition metal atom is, for example, at least one of iron atom, ruthenium atom and osmium atom. The nitrogen-containing heteroaromatic ring is at least one of 2,2'-bipyridine, 1,10-phenantroline and derivatives thereof.

As the solvent, for example, acetonitrile, N,N-dimethylformamide, propylene carbonate, o-dichlorobenzene, glycerin, water, ethyl alcohol, propyl alcohol, dimethyl carbonate, ethylene carbonate, γ-butyrolactone, N-methylpyrrolidone, 2-methyl tetrahydrofuran, toluene, tetrahydrofuran, benzonitrile, cyclohexane, normal hexane, acetone, nitrobenzene, 1,3-dioxolane, furan, benzotrifluoride, or a mixture containing one or more of them can be used.

Typically, the solution further contains an electrolyte. As the electrolyte, for example, tetrabutylammonium perchlorate, potassium hexafluorophosphate, lithium trifluoromethanesulfonate, lithium perchlorate, tetra-n-butylammonium tetrafluoroborate, tripropylamine, tetra-n-butylammonium fluoroborate, or a mixture containing one or more of them can be used.

The solution may further contain a chloride ion. In this case, if silver is used as the material of the electrode 11c, the electrode 11c can be used as a silver-silver chloride electrode.

The voltage-supply circuit 2 and the ammeter 3 are electrically connected in series between the electrodes 11a and 11b.

The voltage-supply circuit 2 applies operating voltage between the electrodes 11a and 11b. The voltage-supply circuit 2 can reverse the polarity of the operating voltage. The voltage-supply circuit 2 can also change the absolute value of the operating voltage. In the case where the electrode 11c is omitted, the voltage-supply circuit 2 may be unable to change the absolute value of the operating voltage.

The ammeter 3 is connected between the voltage supply circuit 2 and the electrode 11b. The ammeter 3 may be connected between the voltage-supply circuit 2 and the electrode 11a. The ammeter measures the amount of electric current flowing between the electrodes 11a and 11b.

The voltmeter 4a is connected between the electrodes 11a and 11c. The voltmeter 4a measures the potential difference between the electrodes 11a and 11c. This potential difference corresponds to the potential difference between the electrode 11a and the solution. The voltmeter 4a may be omitted.

The voltmeter 4b is connected between the electrodes 11b and 11c. The voltmeter 4b measures the potential difference between the electrodes 11b and 11c. This potential difference corresponds to the potential difference between the electrode 11b and the solution. The voltmeter 4b may be omitted.

The controller 5 is connected to the voltage-supply circuit 2, the ammeter 3, and the voltmeters 4a and 4b. The controller controls the operation of the voltage-supply circuit 2 such that the polarity of the operating voltage reverses and determines the timing of reversing the polarity based on the output of the ammeter 3. Further, the controller 5 controls operation of the voltage-supply circuit 2 based on the output of at least one of the voltmeters 4a and 4b such that the absolute value of the operating voltage falls within a tolerance. These controls will be described later in more detail.

Next, the characteristics of the above-described ECL cell 1 will be explained with reference to FIG. 2.

FIG. 2 is a graph showing an example of electrochemical properties of the ECL cell 1 obtained by cyclic voltammetry.

The data shown in FIG. 2 was obtained for an ECL cell 1 in which tris(bipyridine)ruthenium hexafluorophosphate, $[Ru(bpy)_3](PF_6)_2$ was used as the emitting material. In FIG. 2, the abscissa indicates the electric potential, while the ordinate indicates the amount of electric current. Here, the electric potential of the electrode 11c is assumed to be zero.

In the emitting layer 12 of the ECL cell 1, the oxidation reactions represented by the following reaction formulae (1) and (4) and the reduction reactions represented by the following reaction formulae (2), (3) and (5) can occur. In FIG. 2, the reference symbols R1 to R5 indicate electric potentials at which the reactions of the formulae (1) to (5) occur, respectively.

$$[Ru(bpy)_3]^{2+} \rightarrow [Ru(bpy)_3]^{3+} + e^- \quad (1)$$

$$[Ru(bpy)_3]^{3+} + e^- \rightarrow [Ru(bpy)_3]^{2+} \quad (2)$$

$$[Ru(bpy)_3]^{2+} + e^- \rightarrow [Ru(bpy)_3]^{1+} \quad (3)$$

$$[Ru(bpy)_3]^{1+} \rightarrow [Ru(bpy)_3]^{2+} + e^- \quad (4)$$

$$[Ru(bpy)_3]^{1+} + e^- \rightarrow [Ru(bpy)_3]^{0} \quad (5)$$

When the product of the reaction represented by the formula (1) and the product of the reaction represented by the formula (3) react with each other, an exciton is produced as shown in the following formula (6).

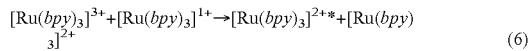

(6)

As shown by the following formula (7), light emission occurs when this complex ion in the excited state causes a transition to the stationary state, which is a low-energy state.

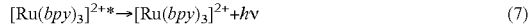

(7)

As will be apparent from the above, promoting the reactions of the formulae (1) and (3) can achieve a high luminance. That is, as will be apparent from FIG. 2, a high luminance can be achieved, for example, by setting the potential difference between the electrode 11a and the solution lower than about −1.7 V and setting the potential difference between the electrode 11b and the solution higher than about 1.0 V.

However, the potential difference between the electrode 11a or 11b and the solution may vary depending on various factors. Thus, if the voltage applied between the electrodes 11a and 11b is set such that the potential difference between the electrode 11a and the solution in the initial state is lower than the electric potential R3 shown in FIG. 2 and higher than the electric potential R5, the reaction represented by the formula (5) may occur.

The product of the reaction represented by the formula (5) is insoluble or low-soluble in the solvent. Thus, when the reaction represented by the formula (5) occurs, the reaction product thereof will be deposited on the electrode 11a and hinder the injection of charges from the electrode 11a to the emitting layer 12. Consequently, the luminance of the ECL cell 1 will be lowered.

The light-emitting device shown in FIG. 1 is driven by, for example, the method described below with reference to FIGS. 3 and 4. In this case, a reduction in luminance of the ECL cell 1 can be suppressed.

Figure 3:
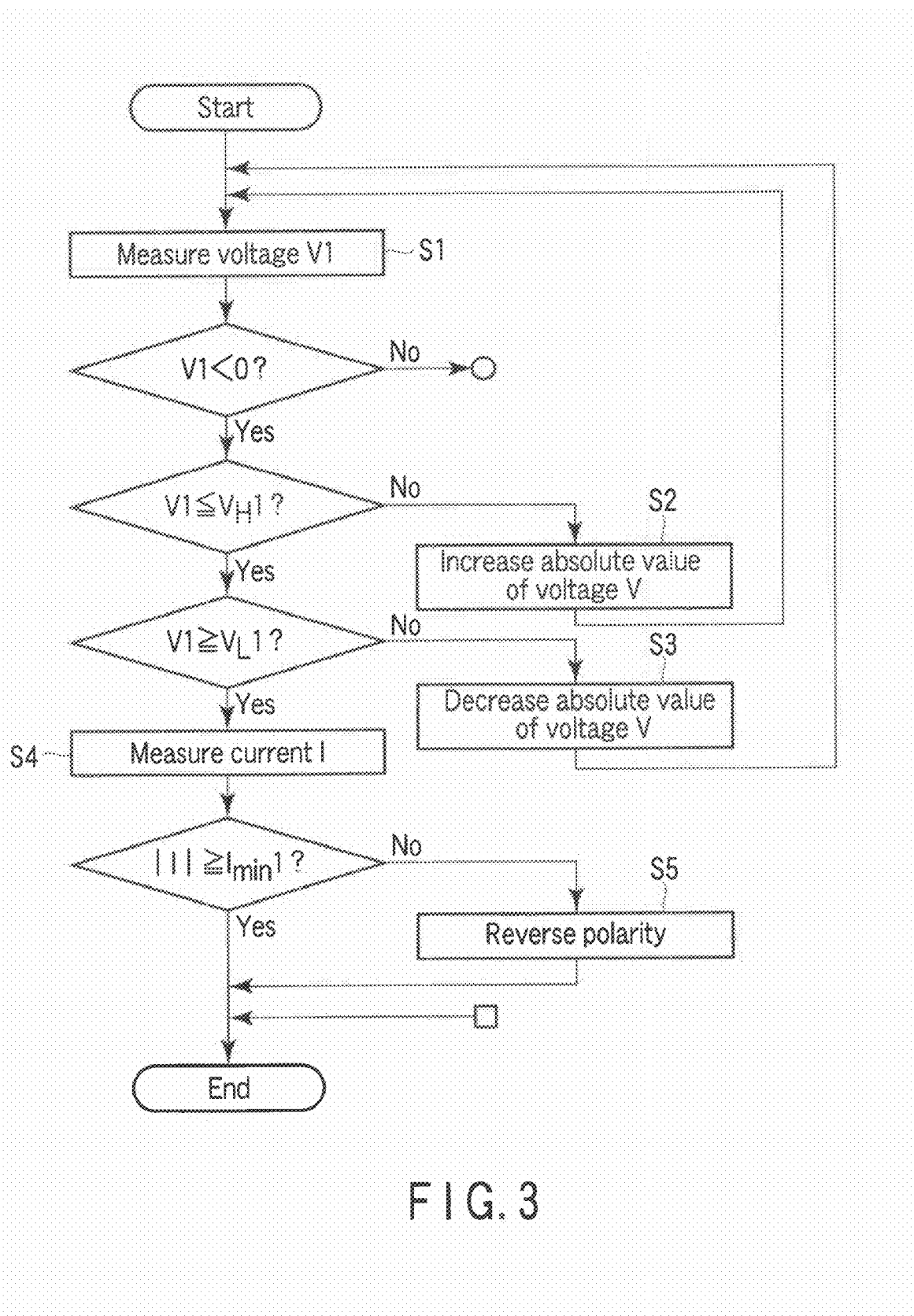
FIG. 3 is a flow chart showing an example of a method of driving the light-emitting device shown in FIG. 1.
Figure 4:
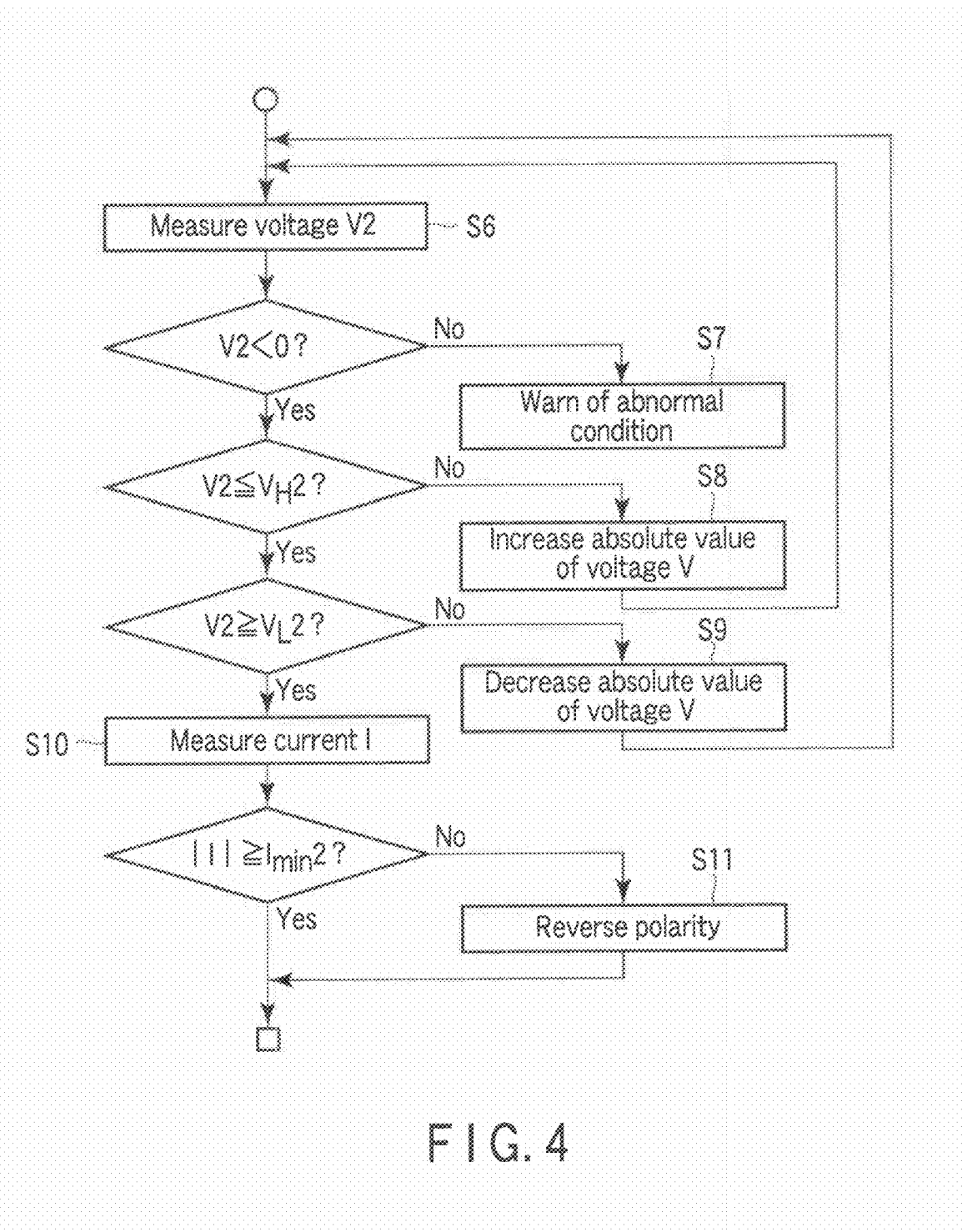
FIG. 4 is a flow chart showing an example of a method of driving the light-emitting device shown in FIG. 1.

FIGS. 3 and 4 are flow charts showing an example of a method of driving the light-emitting device shown in FIG. 1.

According to this driving method, the voltage applied between the electrodes 11a and 11b is set such that the potential difference between the electrode 11a and the solution in the initial state is lower than the electric potential R3 shown in FIG. 2 and higher than the electric potential R5. Then, the processes shown in FIGS. 3 and 4 are performed continuously, at regular time intervals, or in the event that an operator inputs a command to an input unit (not shown).

This process starts with a step S1. In the step S1, the potential difference V1 between the electrode 11a and the electrode 11c is measured.

The controller 5 determines if the potential difference V1 is less than zero. In the case where the potential difference V1 is equal to or greater than zero, the process shown in FIG. 4 is performed. This process will be described later.

In the case where the potential difference V1 is a negative value, the controller 5 compares the potential difference V1 with an upper limit $V_H 1$. The upper limit $V_H 1$ is a negative value that the controller 5 stores. The upper limit $V_H 1$ is lower than the electric potential R3.

In the case where the potential difference V1 is equal to or greater than the upper limit $V_H 1$, a step S2 is performed. In the step S2, the absolute value of the voltage applied between the electrodes 11a and 11b is increased without reversing the polarity thereof. The increment is set smaller than the difference between the electric potential R3 and the electric potential R5.

Then, the above-described step S1 is performed again. In the case where the potential difference V1 is a negative value and higher than the upper limit $V_H 1$, the loop of steps S1 and S2 is repeated until the potential difference V1 changes to the upper limit $V_H 1$ or lower.

In the case where the potential difference V1 is equal to or lower than the upper limit $V_H 1$, the controller 5 compares the potential difference V1 with a lower limit $V_L 1$. The lower limit $V_L 1$ is a negative value that the controller 5 stores. The lower limit $V_L 1$ is lower than the upper limit $V_H 1$ and higher than the electric potential R5.

In the case where the potential difference V1 is lower than the lower limit $V_L 1$, a step S3 is performed. In the step S3, the absolute value of the voltage V is decreased without reversing the polarity thereof. The decrement is set smaller than the difference between the upper limit $V_H 1$ and the electric potential R5.

Then, the above-described step S1 is performed again. In the case where the potential difference V1 is lower than the lower limit $V_L 1$, the loop of steps S1 and S3 is repeated until the potential difference V1 changes to the lower limit $V_L 1$ or higher.

In the case where the potential difference V1 is equal to or higher than the lower limit $V_L 1$, a step S4 is performed. In the step S4, the amount of current flowing between the electrode 11b and the electrode 11a is measured.

The controller 5 compares the absolute value |I| of the amount of current I with a criteria value $I_{min} 1$. In the case where the absolute value |I| is equal to or greater than the criteria value $I_{min} 1$, the process is terminated. Note that the criteria value $I_{min} 1$ is a positive value that the controller 5 stores. The criteria value $I_{min} 1$ is smaller than the absolute value of the amount of current flowing between the electrode 11b and the electrode 11a in the initial state.

In the case where the absolute value |I| is smaller than the criteria value $I_{min} 1$, a step S5 is performed. In the step S5, the polarity of the voltage V is reversed. Here, the absolute value of the voltage may or may not be changed. After the step S5 is performed, this process is terminated.

In the case where the potential difference V1 is zero or a positive value, a step S6 is performed as shown in FIG. 4. In the step S6, the potential difference V2 between the electrode 11b and the electrode 11c is measured.

The controller 5 determines if the potential difference V2 is less than zero. In the case where the potential difference V2 is equal to or greater than zero, a step S7 is performed. In the step S7, it alerts an operator to abnormal conditions, for example. For the alert relating to the abnormal conditions, for example, one or more of visual effects, sound effects and vibration is utilized.

In the case where the potential difference V2 is a negative value, the controller 5 compares the potential difference V2 with an upper limit $V_H 2$. The upper limit $V_H 2$ is a negative value that the controller 5 stores. The upper limit $V_H 2$ is lower than the electric potential R3.

In the case where the potential difference V2 is equal to or higher than the upper limit $V_H 2$, a step S8 is performed. In the step S8, the absolute value of the voltage V applied between the electrodes 11a and 11b is increased without reversing the polarity thereof. This increment is set smaller than the difference between the electric potential R3 and the electric potential R5.

Then, the above-described step S6 is performed again. In the case where the potential difference V2 is a negative value and higher than the upper limit $V_H 2$, the loop including the steps S6 and S8 is repeated until the potential difference V2 is changed to the upper limit $V_H 2$ or lower.

In the case where the potential difference is equal to or lower than the upper limit $V_H 2$, the controller 5 compares the potential difference V2 with a lower limit $V_L 2$. The lower limit $V_L2$ is a negative value that the controller 5 stores. The lower limit $V_L2$ is lower than the upper limit $V_H2$ and higher than the electric potential R5.

In the case where the potential difference V2 is lower than the lower limit $V_L2$, a step S9 is performed. In the step S9, the absolute value of the voltage V is decreased without reversing the polarity thereof. The decrement is set smaller than the difference between the upper limit $V_H2$ and the electric potential R5.

Then, the above-described step S6 is performed again. In the case where the potential difference V2 is lower than the lower limit $V_L2$, the loop including the steps S6 and S9 is repeated until the potential difference V2 changes to the lower limit $V_L2$ or higher.

In the case where the potential difference V2 is equal to or higher than the lower limit $V_L2$, a step S10 is performed. In the step S10, an amount of electric current I flowing between the electrode 11b and the electrode 11a is measured.

The controller 5 compares the absolute value |I| of the amount of electric current I with a criteria value $I_{min}2$. In the case where the absolute value |I| is the criteria value $I_{min}2$ or more, the process is terminated. Note that the criteria value $I_{min}2$ is a positive value that the controller 5 stores. The criteria value $I_{min}2$ is smaller than the absolute value of the amount of electric current that flows between the electrode 11b and the electrode 11a in the initial state.

In the case where the absolute value |V| is less than the criteria value $I_{min}2$, a step S11 is performed. In the step S11, the polarity of the voltage V is reversed. Here, the absolute value of the voltage V may or may not be changed. After the step S11 is performed, the process is terminated.

In this driving method, the feedback control including the steps S1 to S3 sets the potential difference V1 between the upper limit $V_H1$ and the lower limit $V_L1$. Since the upper limit $V_H1$ is lower than the electric potential R3, the reaction represented by the formula (3) can be caused. On the other hand, since the lower limit $V_L1$ is higher than the electric potential R5, the reaction represented by the formula (5) can be suppressed. That is, in the case where a negative voltage is applied between the electrode 11a and the electrode 11b, a high luminance can be achieved and production of an insoluble or low-soluble complex can be suppressed.

Further, in this driving method, the feedback control including the steps S6, S8 and S9 sets the potential difference V2 between the upper limit $V_H2$ and the lower limit $V_L2$. Since the upper limit $V_H2$ is lower than the electric potential R3, the reaction represented by the formula (3) can be suppressed. On the other hand, since the lower limit $V_L2$ is higher than the electric potential R5, the reaction represented by the formula (5) can be suppressed. That is, in the case where a positive voltage is applied between the electrode 11a and the electrode 11b, a high luminance can be achieved and production of an insoluble or low-soluble complex can be suppressed.

Moreover, in this driving method, the polarity of the operating voltage V is reversed in the case where the absolute value |I| of the amount of electric current flowing between the electrode 11b and the electrode 11a is less than the criteria value $I_{min}1$ or $I_{min}2$. The absolute value |I| relates to the amount of the insoluble or low-soluble complex deposited on the electrode 11a or 11b. That is, when the amount of deposit on the electrode 11a or 11b increases, the absolute value |I| will decrease.

When the polarity of the operating voltage V is reversed, the reverse reaction of the reaction represented by the formula (5) will be caused. In other words, the insoluble or low-soluble complex changes to a soluble complex ion. As a result, the absolute value |I| increases. That is, the performance of the ECL cell 1 is recovered.

In this method, the upper limits $V_H1$ and $V_H2$ and the lower limits $V_L1$ and $V_L2$ are fixed values. Instead, at least one of the upper limits $V_H1$ and $V_H2$ and lower limits $V_L1$ and $V_L2$ may be a variable that changes, for example, in accordance with a command input by an operator.

The upper limits $V_H1$ and $V_H2$ may or may not be equal to each other. Similarly, the lower limits $V_L1$ and $V_L2$ may or may not be equal to each other. When the lower limit $V_L2$ is set higher than the lower limit $V_L1$, deposition of the insoluble or low-soluble complex on the electrode 11b can be less prone to occur as compared with the deposition of the insoluble or low-soluble complex on the electrode 11a.

As described above, the front side of the light-emitting device is the side of the substrate 10b. Thus, when the insoluble or low-soluble complex deposits on the electrode 11b, the deposit hinders the light transmission. Therefore, when the deposition of the insoluble or low-soluble complex on the electrode 11b is made less prone to occur, a drop in luminance due to the drop in transmittance will be less prone to occur.

In the process shown in FIGS. 3 and 4, the steps S4, S5, S10 and S11 can be omitted. In this case, it is difficult to cause the change of the insoluble or low-soluble complex into the soluble complex ion. However, production of the insoluble or low-soluble complex can be suppressed.

In this method, used are the criteria values $I_{min}1$ and $I_{min}2$ that the controller 5 stores. That is, each of the criteria values $I_{min}1$ and $I_{min}2$ is a fixed value. Instead, at least one of the criteria values $I_{min}1$ and $I_{min}2$ may be a variable that changes, for example, in accordance with a command input by an operator.

The criteria values $I_{min}1$ and $I_{min}2$ may or may not be equal to each other. For example, when the criteria value $I_{min}2$ is set greater than the criteria value $I_{min}1$, the deposition of the insoluble or low-soluble complex on the electrode 11b can be less prone to occur as compared with the deposition of the insoluble or low-soluble complex on the electrode 11a. That is, a drop in luminance due to the drop in transmittance can be less prone to occur.

In the step S5, after a lapse of a certain time period since the polarity of the operating voltage V is reversed, the polarity may be reversed again. When the time period is sufficiently long, the insoluble or low-soluble complex can be changed to the soluble complex ion. Note that in this case, the process shown in FIG. 4 is not performed.

In the process shown in FIG. 3, the steps S1 to S3 can be omitted. In this case, the production of the insoluble or low-soluble complex is prone to occur as compared with the case where the steps S1 to S3 are not omitted. However, it is possible to cause the change of the insoluble or low-soluble complex into the soluble complex ion. Note that in this case, the process shown in FIG. 4 is not performed.

Various modifications can be made on the light-emitting device.

Figure 5:
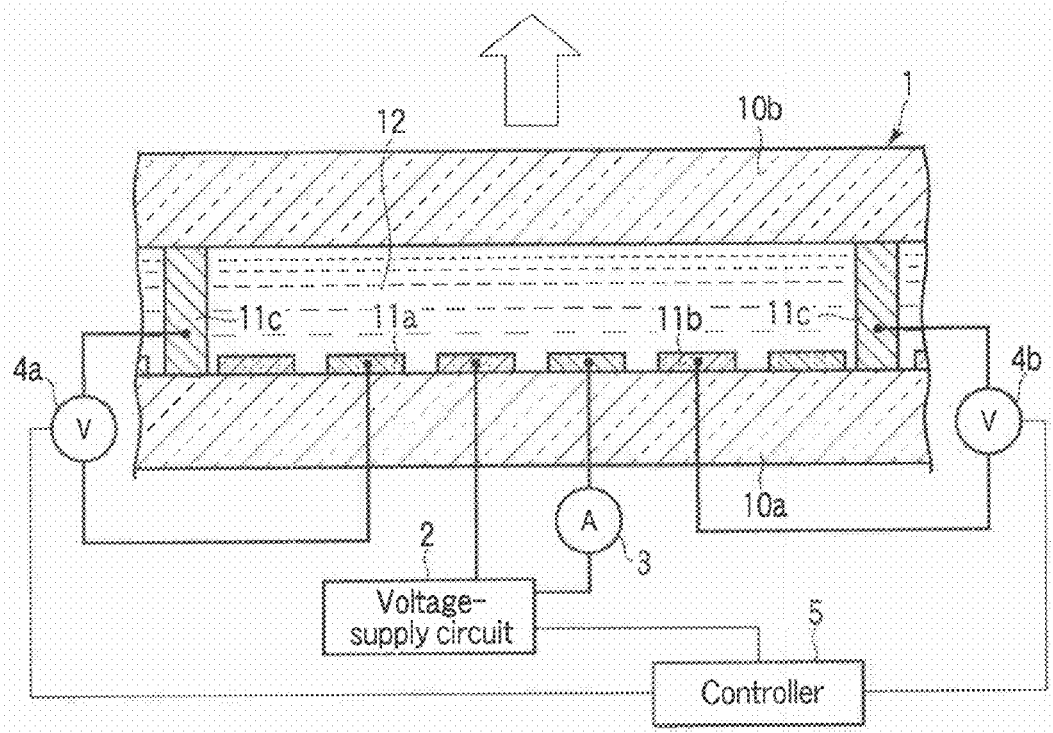
FIG. 5 is a sectional view schematically showing a modified example of the light-emitting device.
Figure 6:
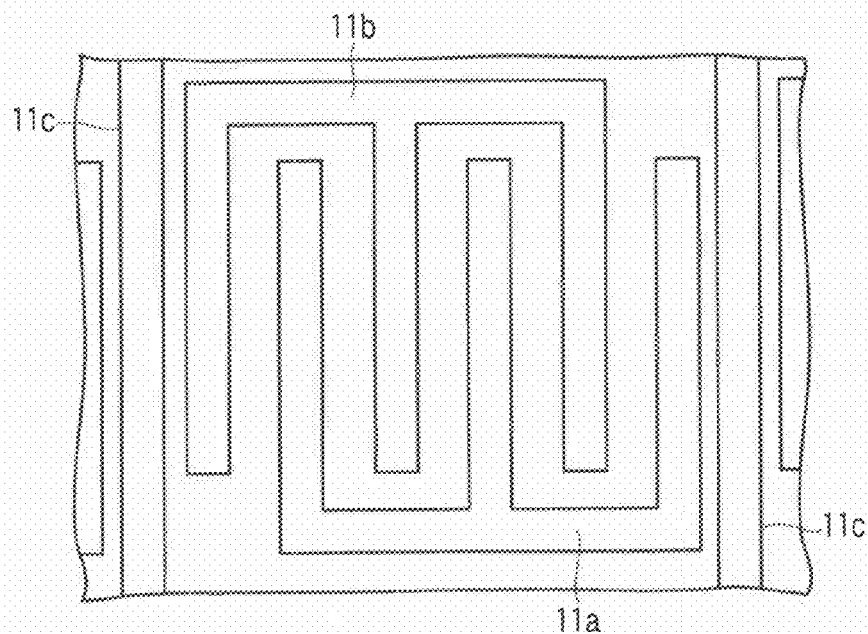
FIG. 6 is a plan view schematically showing electrodes included in the light-emitting device shown in FIG. 5.

FIG. 5 is a sectional view schematically showing a modified example of the light-emitting device. FIG. 6 is a plan view schematically showing electrodes included in the light-emitting device shown in FIG. 5.

In the light-emitting device shown in FIG. 5, comb-shaped electrodes shown in FIG. 6 are used as the electrodes 11a and 11b instead of parallel plate electrodes. The light-emitting device shown in FIG. 5 is the same as the light-emitting device shown in FIG. 1 except for this. Note that the front side of this light-emitting device is the side of the substrate 10b, while the backside thereof is the side of the substrate 10a.

In the case where the structure shown in FIG. 5 is employed, the same effects as those achieved in the case of employing the structure shown in FIG. 1 can be obtained. In addition, since both the electrodes 11a and 11b are formed above the substrate 10a in the structure shown in FIG. 5, the light-emitting device shown in FIG. 5 can be manufactured easily as compared with the light-emitting device shown in FIG. 1.

Next, the second embodiment will be described.

Figure 7:
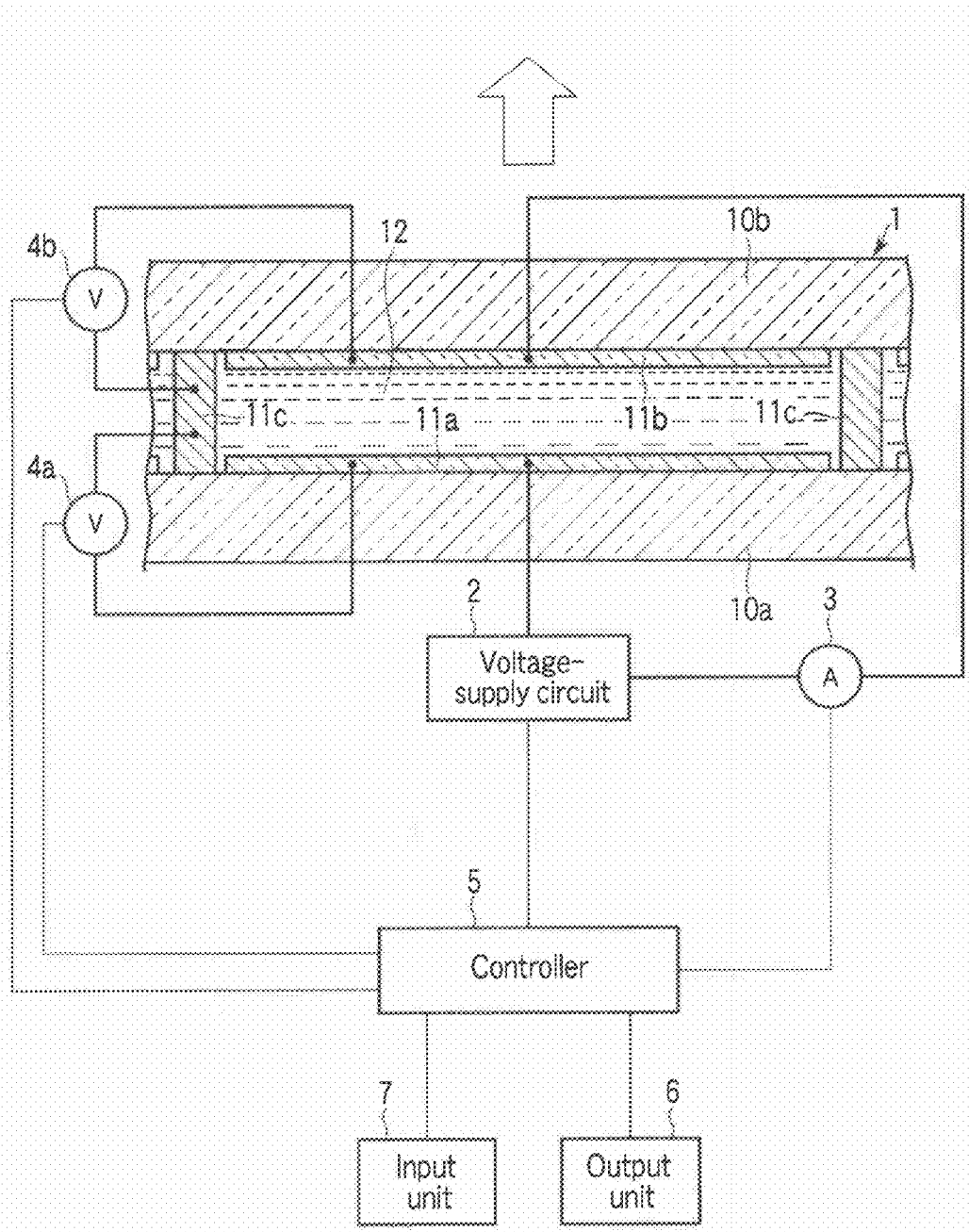
FIG. 7 is a sectional view schematically showing a light-emitting device according to a second embodiment.

FIG. 7 is a sectional view schematically showing a light-emitting device according to the second embodiment.

The light-emitting device shown in FIG. 7 is almost the same as the light-emitting device described with reference to FIG. 1 except that the following structure is employed.

That is, this light-emitting device further includes an output unit 6 and an input unit 7.

The output unit 6 is connected to the controller 5. The output unit 6 outputs the information produced by the controller 5 in a form perceivable by an operator. For example, the output unit outputs the information utilizing one or more of visual effects, sound effects and vibration. The output unit is, for example, a display, a lamp, an acoustic generator such as buzzer and speaker, or a vibrator.

The input unit 7 is connected to the controller 5. The input unit is, for example, a button switch, a lever switch, a touch panel, a keyboard, or a mouse. When an operator inputs a command into the input unit 7, the controller 7 performs a task to be described later.

The controller 5 performs the feedback control described with reference to FIGS. 3 and 4 continuously, at regular time intervals, or in the event that an operator inputs the command to the input unit 7. Further, the controller 5 performs the following sequence control instead of the sequence control including the steps S4 and S5 and the sequence control including the steps S10 an S11.

The controller 5 produces the information to be output by the output unit 6 from the amount of electric current I continuously, at regular time intervals, or in the event that an operator inputs a command to the input unit 7. For example, the controller 5 produces numerical information corresponding to the amount of electric current I or the absolute value |I| thereof. Alternatively, the controller 5 compares the absolute value |I| of the amount of electric current I with the criteria value $I_{min}1$ or $I_{min}2$. Further, the controller 5 produces first information in the case where the absolute value |I| is equal to or greater than the criteria value $I_{min}1$ or $I_{min}2$ and produces second information in the case where the absolute value |I| is less than the criteria value $I_{min}1$ or $I_{min}2$.

The controller 5 outputs the information thus produced to the output unit 6. The output unit 6 outputs the information in a form perceivable by an operator. For example, the output unit 6 outputs the information utilizing a display or lamp.

Based on the information output by the output unit 6, an operator judges if the polarity of the operating voltage V should be revered. In the case where the operator judges it is necessary to reverse the polarity, the operator inputs the corresponding information to the input unit 7. The controller 5 reverses the polarity of the operating voltage V based on the command.

In this driving method, an operator judges the necessity of the polarity reversal. Therefore, when the polarity reversal causes a change in luminance, the operator can understand the change to be a result of the polarity reversal.

Various modifications can be made on the light-emitting device.

Figure 8:
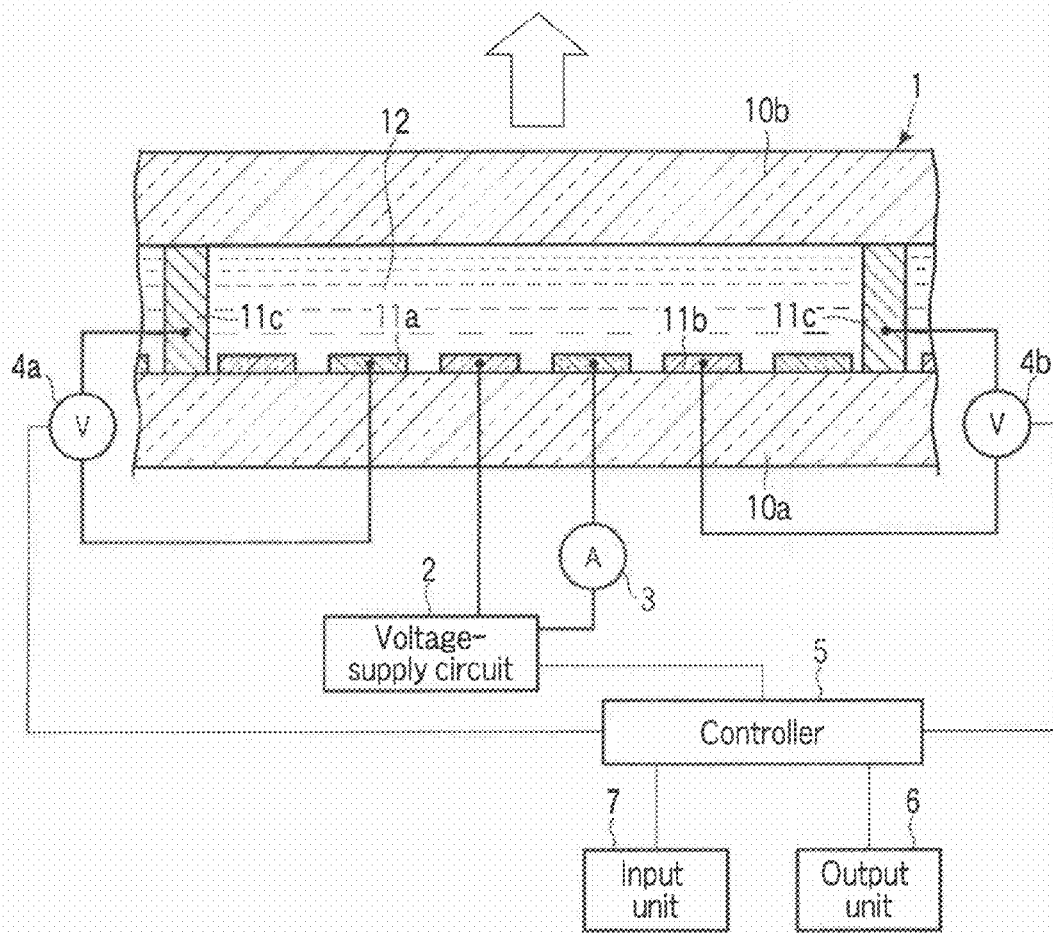
FIG. 8 is a sectional view schematically showing a modified example of the light-emitting device shown in FIG. 7.

FIG. 8 is a sectional view schematically showing a modified example of the light-emitting device shown in FIG. 7.

In the light-emitting device shown in FIG. 8, comb-shaped electrodes are used as the electrodes 11a and 11b instead of the parallel plate electrodes. The light-emitting device shown in FIG. 8 is the same as the light-emitting device shown in FIG. 7 except for this.

In the case where the structure shown in FIG. 8 is employed, the same effects as those achieved in the case of employing the structure shown in FIG. 7 can be obtained. In addition, since both the electrodes 11a and 11b are formed above the substrate 10a in the structure shown in FIG. 8, the light-emitting device shown in FIG. 5 can be manufactured easily as compared with the light-emitting device shown in FIG. 7.

Next, an example of a display to which the light-emitting device is applied will be described with reference to FIG. 9.

Figure 9:
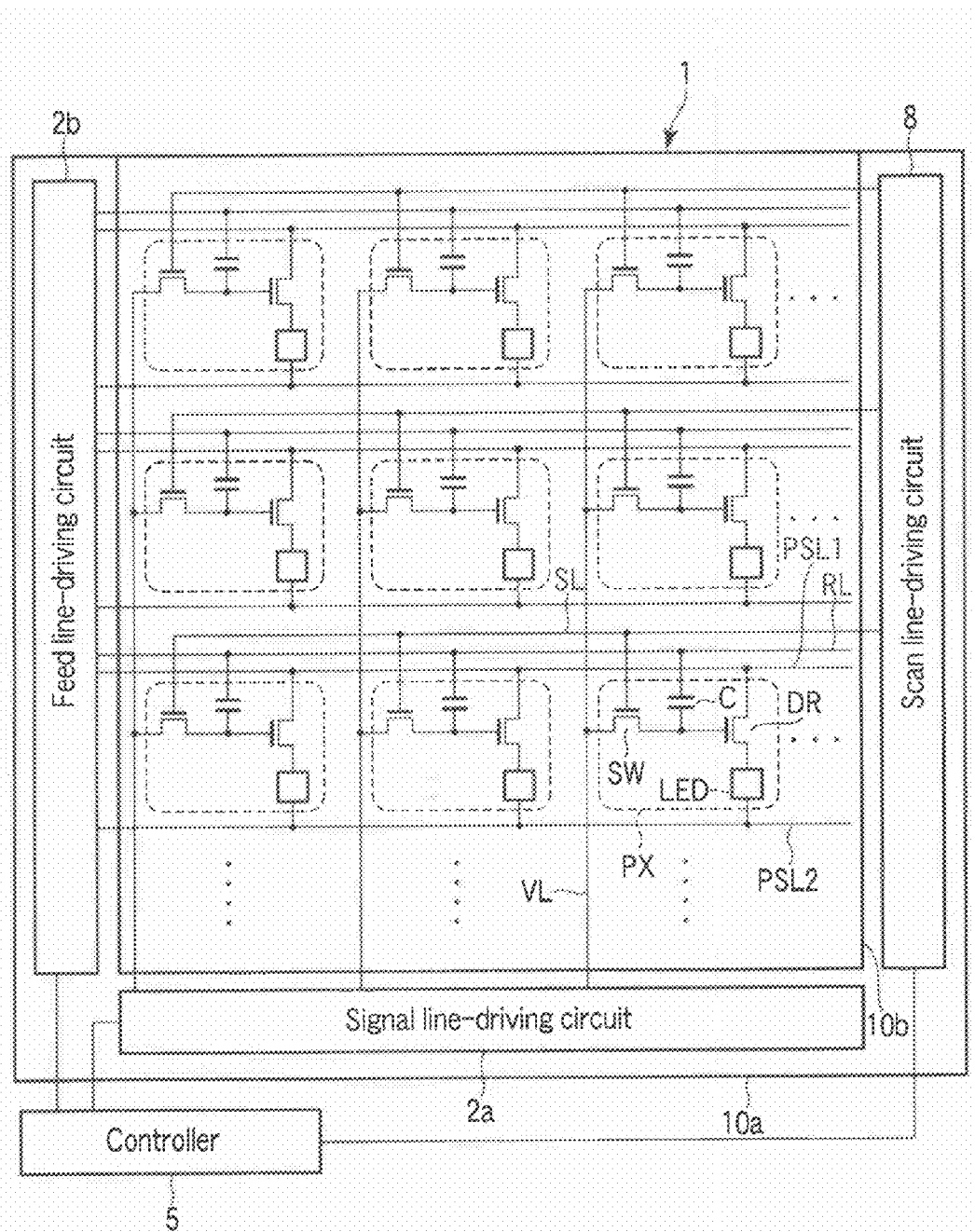
FIG. 9 is a plan view schematically showing an example of a display.

The display shown in FIG. 9 includes an ECL cell 1, a signal line-driving circuit 2a, a feed line-driving circuit 2b, a controller 5 and a scan signal-line-driving circuit 8.

The ECL cell 1 is an active-matrix display panel. This ECL cell 1 is the same as the ECL cell 1 described with reference to FIG. 1 or 5 except that the following structure is employed.

That is, the ECL cell 1 includes pixels PX. Between the substrates 10a and 10b, scan lines SL, reference lines RL, and feed lines PSSL1 and PSL2 are arranged in correspondence with the rows of the pixels. In addition, between the substrates 10a and 10b, signal lines VL are arranged in correspondence with the columns of the pixels PX.

Each of the pixels PX includes a light-emitting element LED, a drive transistor DR, a switch SW and a capacitor C.

The light-emitting element LED includes electrodes 11a and 11b and an emitting layer 12. The electrode 11b of each light-emitting element LED is connected to the feed line PSL2.

The drive transistor DR is connected between the feed line PSL1 and the electrode 11a of the light-emitting element LED. The drive transistor DR is, for example, a thin-film transistor. Here, as an example, the drive transistor DR is assumed to be an n-channel thin-film transistor. The drive transistor DR may be a p-channel thin-film transistor.

The switch SW is connected between the signal line VL and the gate of the drive transistor DR. The switch SW is, for example, a thin-film transistor. Here, as an example, the switch SW is assumed to be an n-channel thin-film transistor. The switch SW may be a different switching element such as a p-channel thin-film transistor.

The capacitor C is connected between the gate of the drive transistor DR and the reference line RL. The capacitor C can be omitted.

To the signal line-driving circuit 2a, the signal lines VL are connected. The signal line-driving circuit 2a outputs a voltage signal to each signal line VL at a magnitude corresponding to a video signal. In other words, the signal line-driving circuit 2a outputs a voltage signal to each signal line VL at a magnitude corresponding to the gray-scale level of the image to be displayed.

To the feed line-driving circuit 2b, the reference lines RL and the feed lines PSL1 and PSL2 are connected. The feed line-driving circuit 2b supplies, for example, a constant voltage to the reference lines RL. In addition, the feed line-driving circuit 2b supplies first and second power supply voltages to each of the feed lines PSL1 and PSL2.

The feed line-driving circuit 2b includes ammeters each connected to the feed line PSL1 or PSL2. Each ammeter measures the amount of electric current I flowing through the feed line PSL1 or PSL2. Note that the combination of the signal line-driving circuit 2a and the feed line-driving circuit 2b corresponds to the combination of the voltage-supply circuit 2 and the ammeter 3 for the ECL cell 1 shown in FIGS. 1 and 5.

To the scan line-driving circuit 8, the scan lines SL are connected. For example, the scan line-driving circuit 8 sequentially selects the canning lines SL, supplies to the selected scan line SL a first scanning signal for closing the switches SW, and supplies to each of the non-selected scan lines SL a second scanning signal for opening the switches SW.

To the controller 5, the signal line-driving circuit 2a, the feed line-driving circuit 2b and the scan line-driving circuit 8 are connected. The controller 5 controls the operations of the driving circuits 2a, 2b and 8.

The display can be driven, for example, by the method shown in FIG. 10.

FIG. 10 is a timing chart showing an example of a method of driving the display shown in FIG. 9. In FIG. 9, the abscissa indicates time, while the ordinate indicates voltage or electric potential. "$V_{scan}(m)$" indicates a waveform of voltage that the scan line-driving circuit 8 outputs to the m-th scan line SL. "$V_{video}$" indicates a waveform of voltage that the signal line-driving circuit 2a outputs to the signal line VL connected to a certain pixel PX. "$V_{PW1}(m)$" and "$V_{PW2}(m)$" indicate waveforms of voltage that the feed line-driving circuit 2b outputs to the feed lines PSL1 and PSL2, respectively.

In the driving method shown in FIG. 10, each frame includes one field. In each field period, the scan lines SL are selected sequentially, and the selected scan line SL is supplied with a first scanning voltage $V_{scan}1$ for closing the switches SW. In each selection period during which the scan line-driving circuit 8 supplies the first scanning voltage $V_{scan}1$ to one of the scan lines SL, a write operation is performed on each pixel PX connected to the selected scan line SL.

Specifically, in an m-th row selection period during which the m-th scan line SL is selected, a first power supply voltage $V_{pw}L$ and a second power supply voltage $V_{pw}H$ are supplied to the m-th feed lines PSL1 and PSL2, respectively under the control of the controller 5. Note that the power supply voltage $V_{pw}H$ is higher than the power supply voltage $V_{pw}L$. Each electric potential of the m-th feed lines PSL1 and PSL2 is kept constant until the signal line-driving circuit 2a selects the m-th scan line SL again.

In the m-th row selection period, the signal line-driving circuit 2a supplies signal voltages $V_{sig}$ under the control of the controller 5 to the signal lines VL at magnitudes corresponding to the video signals to be written in the pixels of the m-th row. Consequently, the gate-to-source voltages of the drive transistors DR are set at magnitudes corresponding to the signal voltages $V_{sig}$. The m-th row selection period terminated when the scan line-driving circuit 8 supplies to the m-th scan line SL the second scanning voltage $V_{scan}2$ for opening the switches SW.

In the period after the beginning of the m-th row selection period to and before the beginning of the next m-th row selection period, the ammeter included in the feed line-driving circuit 2b measures the amount of electric current I(m) flowing through the m-th feed line PSL1 or PSL2. The controller 5 stores the relationship between the gray-scale levels to be displayed and amounts of electric current flowing through the light-emitting element LED. The controller refers the video signals written in the pixels PX of the m-th row to the above-mentioned relationship to calculate the amount of electric current $I_{dv}(m)$ allowed to flow through the m-th feed line PSL1 or PSL2. Further, the controller 5 calculates a lower limit $I_{min}1(m)$ from the amount of electric current $I_{dv}(m)$ utilizing, for example, a function. Note that the lower limit $I_{min}1(m)$ is positive value.

In the case where the absolute value |I(m)| of the amount of electric current I(m) is smaller than the lower limit $I_{min}1(m)$, the controller controls the operation of the feed line-driving circuit 2b such that the polarity of voltage between the m-th feed lines PSL1 and PSL2 reverses when the next m-th row selection period starts as shown in FIG. 10. In other words, when the next m-th row selection period starts, the controller 5 changes the voltage supplied to the m-th feed line PSL1 from the first power supply voltage $V_{pw}L$ to the second power supply voltage $V_{pw}H$ and changes the voltage supplied to the m-th feed line PSL2 from the second power supply voltage $V_{pw}H$ to the first power supply voltage $V_{pw}L$.

On the other hand, in the case where the absolute value |I(m)| of the amount of electric current I(m) is equal to or greater than the lower limit $I_{min}1(m)$, the controller 5 controls the operation of the feed line-driving circuit 2b such that the next m-th row selection period starts while each of the voltage supplied to the m-th feed lines PSL1 and PSL2 is kept constant.

As above, the controller 5 determines in each frame period if the polarity reversal is necessary. The controller 5 reverses the polarity of voltage between the feed lines PSL1 and PSL2 in the next frame period only for the rows to which the polarity reversal should be performed. Therefore, according to this driving method, a drop in luminance due to the deposition of the insoluble or low-soluble complex on the electrode 11a or 11b can be suppressed.

According to at least one embodiment described above, the controller determines a timing of reversing the polarity based on an output of the ammeter or produces information that the output unit outputs in a form perceivable by an operator from an output of the ammeter. Such a technique is advantageous to putting light-emitting devices utilizing ECL elements to practical use.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light-emitting device, comprising:
   an emitting layer including a solution containing an emitting material and a solvent;
   first and second electrodes in contact with the solution;
   a voltage-supply circuit applying an operating voltage between the first and second electrodes;
   an ammeter measuring an amount of electric current flowing between the first and second electrodes; and
   a controller controlling an operation of the voltage-supply circuit such that a polarity of the operating voltage reverses and determining a timing of reversing the polarity based on an output of the ammeter,
   wherein a part of the emitting material is present as a first cation that is soluble in the solvent, and another part of the emitting material is present as a second cation that is a reduction product of the first cation and soluble in the solvent, a reduction product of the second cation being insoluble or low-soluble in the solvent, and wherein the first and second electrodes are arranged on back and front sides of the emitting layer, respectively, and the controller controls the operation of the voltage-supply circuit in a case where the electric potential of the first electrode is lower than the electric potential of the second electrode such that the polarity reverses when an absolute value of the amount of the electric current falls below a first criteria value and controls the operation of the voltage-supply circuit in a case where the electric potential of the first electrode is higher than the electric potential of the second electrode such that the polarity reverses when an absolute value of the amount of the electric current falls below a second criteria value, the second criteria value being greater than the first criteria value.

2. The light-emitting device according to claim 1, further comprising:
a third electrode in contact with the solution;
a first voltmeter measuring a first potential difference between the first and third electrodes; and
a second voltmeter measuring a second potential difference between the second and third electrodes,
wherein the controller controls the operation of the voltage-supply circuit in a case where the first potential difference is a negative value such that the absolute value of the operating voltage increases when the first potential difference exceeds a first upper limit, controls the operation of the voltage-supply circuit in a case where the first potential difference is a negative value such that the absolute value of the operating voltage decreases when the first potential difference falls below a first lower limit lower than the first upper limit, controls the operation of the voltage-supply circuit in a case where the second potential difference is a negative value such that the absolute value of the operating voltage increases when the second potential difference exceeds a second upper limit, and controls the operation of the voltage-supply circuit in a case where the second potential difference is a negative value such that the absolute value of the operating voltage decreases when the second potential difference falls below a second lower limit lower than the second upper limit and higher than the first lower limit.

3. The light-emitting device according to claim 2, wherein the controller controls the operation of the voltage-supply circuit at an initial stage of a service life of the light-emitting device such that an electric potential of the first electrode is lower than an electric potential of the second electrode.

4. The light-emitting device according to claim 1, wherein the controller controls the operation of the voltage-supply circuit at an initial stage of a service life of the light-emitting device such that an electric potential of the first electrode is lower than an electric potential of the second electrode.

5. A light-emitting device, comprising:
an emitting layer including a solution containing an emitting material and a solvent;
first and second electrodes in contact with the solution;
a voltage-supply circuit applying an operating voltage between the first and second electrodes;
an ammeter measuring an amount of electric current flowing between the first and second electrodes;
a controller controlling an operation of the voltage-supply circuit such that a polarity of the operating voltage reverses and determining a timing of reversing the polarity based on an output of the ammeter;
a third electrode in contact with the solution;
a first voltmeter measuring a first potential difference between the first and third electrodes; and
a second voltmeter measuring a second potential difference between the second and third electrodes,
wherein the controller controls the operation of the voltage-supply circuit in a case where the first potential difference is a negative value such that the absolute value of the operating voltage increases when the first potential difference exceeds a first upper limit, controls the operation of the voltage-supply circuit in a case where the first potential difference is a negative value such that the absolute value of the operating voltage decreases when the first potential difference falls below a first lower limit lower than the first upper limit, controls the operation of the voltage-supply circuit in a case where the second potential difference is a negative value such that the absolute value of the operating voltage increases when the second potential difference exceeds a second upper limit, and controls the operation of the voltage-supply circuit in a case where the second potential difference is a negative value such that the absolute value of the operating voltage decreases when the second potential difference falls below a second lower limit lower than the second upper limit.

6. The light-emitting device according to claim 5, wherein a part of the emitting material is present as a first cation that is soluble in the solvent, and another part of the emitting material is present as a second cation that is a reduction product of the first cation and soluble in the solvent, a reduction product of the second cation being insoluble or low-soluble in the solvent.

7. A light-emitting device, comprising:
an emitting layer including a solution containing an emitting material and a solvent;
first and second electrodes in contact with the solution;
a voltage-supply circuit applying an operating voltage between the first and second electrodes;
an ammeter measuring an amount of electric current flowing between the first and second electrodes;
an output unit outputting information in a form perceivable by an operator;
an input unit to which the operator inputs a command;
a controller producing the information from an output of the ammeter and controlling an operation of the voltage-supply circuit such that a polarity of the operating voltage reverses when the command is input to the input unit;
a third electrode in contact with the solution;
a first voltmeter measuring a first potential difference between the first and third electrodes; and
a second voltmeter measuring a second potential difference between the second and third electrodes,
wherein the controller controls the operation of the voltage-supply circuit in a case where the first potential difference is a negative value such that the absolute value of the operating voltage increases when the first potential difference exceeds a first upper limit, controls the operation of the voltage-supply circuit in a case where the first potential difference is a negative value such that the absolute value of the operating voltage decreases when the first potential difference falls below a first lower limit lower than the first upper limit, controls the operation of the voltage-supply circuit in a case where the second potential difference is a negative value such that the absolute value of the operating voltage increases when the second potential difference exceeds a second upper limit, and controls the operation of the voltage-supply circuit in a case where the second potential difference is a negative value such that the absolute value of the operating voltage decreases when the second potential difference falls below a second lower limit lower than the second upper limit.

8. The light-emitting device according to claim 7, wherein a part of the emitting material is present as a first cation that is soluble in the solvent, and another part of the emitting material is present as a second cation that is a reduction product of the first cation and soluble in the solvent, a reduction product of the second cation being insoluble or low-soluble in the solvent, and the second lower limit being higher than the first lower limit.

9. The light-emitting device according to claim 8, wherein the first and second electrodes are arranged on back and front sides of the emitting layer, respectively, and the controller controls the operation of the voltage-supply circuit at an initial stage of a service life of the light-emitting device such that an electric potential of the first electrode is lower than an electric potential of the second electrode.

10. A method of driving a light-emitting device comprising an emitting layer including a solution containing an emitting material and a solvent, and first and second electrodes in contact with the solvent, comprising:
  applying an operating voltage between the first and second electrodes;
  measuring an amount of electric current flowing between the first and second electrodes;
  reversing a polarity of the operating voltage; and
  determining a timing of reversing the polarity based on the amount of electric current,
  wherein the light-emitting device further comprises a third electrode in contact with the solution, and the method further comprises:
  increasing an absolute value of the operating voltage when a first potential difference between the first and third electrodes exceeds a first upper limit in a case where the first potential difference is a negative value; and
  decreasing the absolute value of the operating voltage when the first potential difference falls below a first lower limit lower than the first upper limit in a case where the first potential difference is a negative value.

11. The method according to claim 10, further comprising:
  increasing the absolute value of the operating voltage when a second potential difference between the second and third electrodes exceeds a second upper limit in a case where the second potential difference is a negative value; and
  decreasing the absolute value of the operating voltage when the second potential difference falls below a second lower limit lower than the second upper limit in a case where the second potential difference is a negative value.

* * * * *